(12) United States Patent
Kolb et al.

(10) Patent No.: US 6,376,590 B2
(45) Date of Patent: *Apr. 23, 2002

(54) ZIRCONIA SOL, PROCESS OF MAKING AND COMPOSITE MATERIAL

(75) Inventors: Brant U. Kolb, Afton; Bert T. Chien, Minneapolis, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,374

(22) Filed: Oct. 28, 1999

(51) Int. Cl.$^7$ .............................. B01F 3/12; C08L 33/12; C09K 3/00
(52) U.S. Cl. .................. 524/413; 106/287.19; 106/450; 252/363.5; 423/608; 516/90; 522/81; 523/117
(58) Field of Search ........................ 516/90; 106/287.19, 106/450; 423/608; 524/413; 501/12; 522/81; 523/117

(56) References Cited

U.S. PATENT DOCUMENTS

| | | |
|---|---|---|
| 2,984,628 A | 5/1961 | Alexander et al. |
| 3,018,262 A | 1/1962 | Schroeder |
| 3,066,112 A | 11/1962 | Bowen |
| 3,117,099 A | 1/1964 | Proops et al. |
| 3,442,817 A | 5/1969 | Luebke |
| 3,514,252 A | 5/1970 | Levy, Jr. et al. |
| 3,539,533 A | 11/1970 | Lee, II et al. |
| 3,629,187 A | 12/1971 | Waller |
| 3,708,296 A | 1/1973 | Schlesinger |
| 3,709,706 A | 1/1973 | Sowman .................. 106/57 |
| 3,709,866 A | 1/1973 | Waller |
| 3,729,113 A | 4/1973 | Smith |
| 3,741,769 A | 6/1973 | Smith |
| 3,751,399 A | 8/1973 | Lee, Jr. et al. |
| 3,766,132 A | 10/1973 | Lee, Jr. et al. |
| 3,808,006 A | 4/1974 | Smith |
| 3,860,556 A | 1/1975 | Taylor |
| 4,002,669 A | 1/1977 | Gross et al. |
| 4,069,055 A | 1/1978 | Crivello |
| 4,071,424 A | 1/1978 | Dart et al. ............. 204/159.15 |
| 4,115,346 A | 9/1978 | Gross et al. |
| 4,216,288 A | 8/1980 | Crivello .................. 430/280 |
| 4,250,053 A | 2/1981 | Smith |
| 4,250,311 A | 2/1981 | Crivello .................. 546/9 |
| 4,259,117 A | 3/1981 | Yamauchi et al. ............ 106/35 |
| 4,292,029 A | 9/1981 | Craig et al. ................. 433/228 |
| 4,308,190 A | 12/1981 | Walkowiak et al. |
| 4,327,014 A | 4/1982 | Kawahara et al. .......... 523/116 |
| 4,379,695 A | 4/1983 | Orlowski et al. ........... 433/217 |
| 4,387,240 A | 6/1983 | Berg .......................... 556/440 |
| 4,394,403 A | 7/1983 | Smith ......................... 427/42 |
| 4,404,150 A | 9/1983 | Tsunekawa et al. |

(List continued on next page.)

FOREIGN PATENT DOCUMENTS

| | | |
|---|---|---|
| DE | 195 40 623 A1 | 5/1997 |
| EP | 0 184 467 A2 | 6/1986 |
| EP | 0 712 912 A2 | 5/1996 |
| EP | 0 841 304 A1 | 5/1998 |
| JP | 3-46407 | 6/1984 |
| JP | 4-72768 | 9/1985 |
| WO | WO 93/05875 | 4/1993 |
| WO | WO 96/34829 | 11/1996 |

OTHER PUBLICATIONS

"Routes To Deagglomerated Nanopowder By Chemical Synthesis"; Burgard et al.; *Mat. Res. Soc. Symp. Proc.*, vol. 346, 1994; pp. 101–107.

"Synthesis And Colloidal Processing Of Nanocrystalline ($Y_2O_3$–Stabilized) $ZrO_2$ Powders By A Surface Free Energy Controlled Process"; Burgard, et al.; *Mat. Res. Soc. Symp. Proc.*, vol. 432, 1997, pp. 113–121.

"The Role of Complexing Ligands in the Formation of Non–Aggregated Nanoparticles of Zirconia"; Chatry et al.; *Journal of Sol–Gel Science and Technology* vol. 1, 1994, pp. 233–240.

Japanese Patent Abstract for JP 1076919 A (1989).
Japanese Patent Abstract for JP 1079015 A (1989).
Japanese Patent Abstract for JP 1083518 A (1989).
Japanese Patent Abstract for JP 1083519 A (1989).
Japanese Patent Abstract for JP 1083520 A (1989).
Japanese Patent Abstract for JP 1176225 A (1989).
Japanese Patent Abstract for JP 2137729 A (1990).
Japanese Patent Abstract for JP 2137730 A (1990).
Japanese Patent Abstract for JP 2137731 A (1990).
Japanese Patent Abstract for JP 2137732 A (1990).
Japanese Patent Abstract for JP 3174326 A (1991).
Japanese Patent Abstract for JP 4031307 A (1992).
Japanese Patent Abstract for JP 4089319 A (1992).
Japanese Patent Abstract for JP 7118016 A (1995).
Japanese Patent Abstract for JP 8277114 A. (1997).
Japanese Patent Abstract for JP 9235119 A (1997).
Japanese Patent Abstract for JP 58079818 A (1983).
Japanese Patent Abstract for JP 58135131 A (1983).
Japanese Patent Abstract for JP 59107969 A (1984).
Japanese Patent Abstract for JP 60103033 A (1985).
Japanese Patent Abstract for JP 60137827 A (1985).

(List continued on next page.)

*Primary Examiner*—Richard D. Lovering
(74) *Attorney, Agent, or Firm*—Scott R. Pribnow

(57) ABSTRACT

A zirconia sol comprising an aqueous phase having dispersed therein a plurality of single crystal zirconia particles having an average primary particle size less than about 20 nm. The zirconia sols are substantially non associated having a dispersion index ranging from about 1–3 and are highly crystalline exhibiting a crystallinity index of about 0.65 or greater. Of the crystalline phase, about 70% or greater exists in combined cubic and tetragonal crystal lattice structures without a crystal phase stabilizer. Also described is a hydrothermal method of making zirconia sols having substantially non-associated zirconia particles and composite materials made from the zirconia sols.

34 Claims, No Drawings

U.S. PATENT DOCUMENTS

| | | | |
|---|---|---|---|
| 4,427,799 A | 1/1984 | Orlowski et al. | 523/116 |
| 4,503,169 A | 3/1985 | Randklev | 523/117 |
| 4,544,359 A | 10/1985 | Waknine | 523/115 |
| 4,545,924 A | 10/1985 | Ritter, II | |
| 4,612,138 A * | 9/1986 | Keiser | 516/90 X |
| 4,617,327 A | 10/1986 | Podszun | 523/116 |
| 4,619,817 A | 10/1986 | Stambaugh et al. | 423/266 |
| 4,642,126 A | 2/1987 | Zador et al. | 51/295 |
| 4,649,165 A | 3/1987 | Kuhlmann | 523/116 |
| 4,652,274 A | 3/1987 | Boettcher et al. | 51/298 |
| 4,661,540 A | 4/1987 | Le et al. | 523/409 |
| 4,696,955 A | 9/1987 | Kuhlmann | 522/77 |
| 4,719,091 A | 1/1988 | Wusirika | 423/82 |
| 4,737,593 A | 4/1988 | Ellrich et al. | 568/15 |
| 4,746,685 A | 5/1988 | Masuhara et al. | |
| 4,769,351 A | 9/1988 | Soumiya et al. | 501/105 |
| 4,772,511 A | 9/1988 | Wood et al. | 428/325 |
| 4,772,530 A | 9/1988 | Gottschalk et al. | 430/138 |
| 4,778,671 A | 10/1988 | Wusirika | 423/592 |
| 4,784,794 A | 11/1988 | Kato | |
| 4,868,288 A | 9/1989 | Meier | 534/15 |
| 4,874,450 A | 10/1989 | Gottschalk | 156/275.5 |
| 4,886,624 A | 12/1989 | Gradeff et al. | |
| 4,927,560 A | 5/1990 | Osaka et al. | |
| 4,931,414 A | 6/1990 | Wood et al. | 501/103 |
| 4,946,665 A * | 8/1990 | Recasens et al. | 423/608 |
| 4,954,414 A | 9/1990 | Adair et al. | 430/138 |
| 4,985,229 A | 1/1991 | Obitsu et al. | 423/629 |
| 4,985,340 A | 1/1991 | Palazzotto et al. | 430/270 |
| 5,037,579 A | 8/1991 | Matchett | 423/608 X |
| 5,055,372 A | 10/1991 | Shanklin et al. | 430/138 |
| 5,057,393 A | 10/1991 | Shanklin et al. | 430/138 |
| 5,073,476 A | 12/1991 | Meier et al. | 430/280 |
| 5,084,586 A | 1/1992 | Farooq | 523/16 |
| 5,089,536 A | 2/1992 | Palazzotto | 522/16 |
| 5,124,417 A | 6/1992 | Farooq | 526/90 |
| 5,190,583 A * | 3/1993 | Menzel et al. | 524/413 X |
| 5,234,870 A | 8/1993 | Osaka et al. | 501/12 |
| 5,275,759 A | 1/1994 | Osaka et al. | 501/103 X |
| 5,332,429 A | 7/1994 | Mitra et al. | 106/35 |
| 5,460,701 A | 10/1995 | Parker et al. | 204/164 |
| 5,470,910 A | 11/1995 | Spanhel et al. | 524/785 |
| 5,545,676 A | 8/1996 | Palazzotto et al. | 522/15 |
| 5,558,849 A * | 9/1996 | Sharp | 501/12 X |
| 5,593,781 A | 1/1997 | Nass et al. | 428/403 |
| 5,609,675 A | 3/1997 | Noritake et al. | 106/35 |
| 5,643,497 A | 7/1997 | Kaga et al. | 106/450 X |
| 5,648,407 A | 7/1997 | Goetz et al. | 523/213 |
| 5,658,376 A | 8/1997 | Noguchi et al. | 106/31.43 |
| 5,698,483 A | 12/1997 | Ong et al. | 501/12 |
| 5,760,126 A | 6/1998 | Engle et al. | 524/516 |
| 5,776,239 A | 7/1998 | Bruno | 106/137 |
| 5,830,242 A | 11/1998 | Yao | 23/200 |
| 5,856,373 A | 1/1999 | Kaisaki et al. | 572/25 |
| 5,879,715 A | 3/1999 | Higgins et al. | 424/489 |
| 5,886,069 A | 3/1999 | Bolt | 523/223 |
| 5,935,275 A | 8/1999 | Burgard et al. | 23/295 R |
| 5,936,006 A | 8/1999 | Rheinberger et al. | 523/116 |
| 5,942,559 A | 8/1999 | Voser et al. | 523/115 |
| 6,025,406 A | 2/2000 | Oxman et al. | 522/14 |
| 6,136,886 A | 10/2000 | Deguchi | 523/116 |

OTHER PUBLICATIONS

Japanese Patent Abstract for JP 60176920 A (1985).
Japanese Patent Abstract for JP 60255622 A (1986).
Japanese Patent Abstract for JP 61227917 A (1986).
Japanese Patent Abstract for JP 61270217 A (1987).
Japanese Patent Abstract for JP 61141620 A (1986).
Japanese Patent Abstract for JP 62065932 A (1987).
Japanese Patent Abstract for JP 62091421 A (1987).
Japanese Patent Abstract for JP 62128924 A (1987).
Japanese Patent Abstract for JP 62212224 A (1987).
Japanese Patent Abstract for JP 62226815 A (1987).
Japanese Patent Abstract for JP 63002809 A (1988).
Cabot Corporation Product Brochure, "Cab–O–Sil®Untreated Fumed Silica Properties and Functions," Title page, Publication page, and pp. 3–5(1978).
Degussa AG Product Brochure, "Technical Bulletin Pigments" Aerosil®as a Thickening Agent for Liquid Systems, No. 23, Title page, Publication page, and pp. 3 and 29 (Jul. 1989).
Degussa AG Product Brochure, "Technical Bulletin Pigments," Aerosil®in Pharmaceuticals and Cosmetics, No. 49, Title page, Publication pages, and pp. 5 and 6 (Sep. 1997).

* cited by examiner

ZIRCONIA SOL, PROCESS OF MAKING AND COMPOSITE MATERIAL

BACKGROUND

This invention relates to zirconia sols and to methods of making zirconia sols.

The incorporation of zirconia sols into organic matrix materials (e.g., polymers) can provide optically transparent or translucent materials having high x-ray opacity and high refractive index. The degree to which the x-ray opacity and/or refractive index of the organic matrix may be increased is a function of the loading limit of the sol in the organic matrix and the x-ray scattering capability or refractive index of the zirconia particles.

The characteristics of the zirconia sol (e.g., degree of crystallinity of the zirconia particles, crystal lattice structure, particle size and degree of primary particle association) govern the optical transmission, x-ray opacity, refractive index and the loading limit of the zirconia sol in an organic polymer. Condensed crystalline zirconia is a high refractive index material having a large x-ray scattering capability whereas amorphous hydrous zirconium salts have a lower refractive index and lower x-ray scattering capability. Optical transmission of a zirconia sol is a function of the size of the zirconia particles in the sol. As the primary particle size increases and/or the degree of association between primary particles increases the optical transmission is reduced. Loading limit of a zirconia sol in an organic matrix material is a function of both particle association and particle aspect ratio. As particle association in a zirconia sol increases, the loading limit of the zirconia sol in an organic matrix decreases. Similarly, as the aspect ratio of the zirconia particles in a sol increases, the loading limit of the zirconia particles in an organic matrix decreases. Accordingly, zirconia particles having a low aspect ratio are preferred when it is desired to incorporate high loadings of the particles in organic matrix materials. In this respect, zirconia particles having cubic and/or tetragonal crystal phases are preferred over those having a monoclinic crystal phase.

SUMMARY

The present invention provides zirconia sols and methods for making zirconia sols wherein the sols comprise crystalline zirconia particles having a small primary particle size and substantially non-associated form. Sols of the present invention may be added to organic matrix materials (e.g., monomer, oligomers and polymers) to provide transparent or translucent zirconia filled composite materials having high index of refraction and high x-ray opacity.

In one aspect, the present invention provides zirconia sols comprising an aqueous phase having dispersed therein a plurality of single crystal zirconia particles having an average primary particle size less than about 20 nm, preferably ranging from about 7–20 nm. The zirconia sols of the present invention are substantially non associated (i.e., non aggregated and non agglomerated) having a dispersion index ranging from about 1–3, more preferably ranging from 1–2.5 and most preferably ranging from about 1–2. The zirconia sols of the present invention are highly crystalline exhibiting a crystallinity index of about 0.65 or greater, more preferably about 0.75 or greater and most preferably about 0.85 or greater. Of the crystalline phase, about 70% or greater, more preferably about 75% or greater and most preferably about 85% or greater exists in combined cubic and tetragonal crystal lattice structures.

In another aspect, the present invention provides a method of making a zirconia sol comprising the steps of:

(a) providing an aqueous solution comprising a polyether acid zirconium salt; and (b) hydrolyzing the aqueous solution of the polyether acid zirconium salt by heating the solution at a temperature and a pressure sufficient to convert the polyether acid zirconium salt into crystalline zirconia particles.

In a preferred embodiment of the process, step (a) comprises:

(a) reacting an aqueous solution of a zirconium salt with a polyether carboxylic acid to form an aqueous solution comprising a polyether acid zirconium salt and a free acid; and (b) optionally, removing at least a portion of the free acid.

In a preferred embodiment, the step of removing at least the free acid comprises:

(a) drying an aqueous solution of the polyether acid zirconium salt; and (b) dispersing the dried acid polyether acid zirconium salt in water to form an aqueous solution.

Preferred zirconium salts for use as starting materials in the formation of a polyether acid zirconium salt have the general formula:

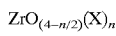

where X is a carboxylic acid displaceable counterion selected from the group consisting of formate, propionate, nitrate, chloride, carbonate and a combination thereof; and wherein n ranges from 0.5–4. A particularly preferred starting material is zirconium acetate.

Preferred polyether carboxylic acids for use in the process of the present invention have the general formula:

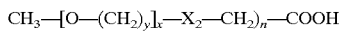

where $X_2$ is selected from the group consisting of:
—O—, —S—, —C(O)O— and —C(O)NH;
n ranges from about 1–3;
x ranges from about 1–10; and
y ranges from about 1–4.

Examples of particularly preferred polyether carboxylic acids include 2-[2-(2-methoxyethoxy)ethoxy]acetic acid and 2-(2-methoxyethoxy) acetic acid.

In another aspect, the present invention provides a composite material comprising:

an organic matrix material having dispersed therein a plurality of single crystal zirconia particles having an average primary particle size less than about 20 nm and having a dispersion index ranging from about 1–3, wherein the zirconia particles have a crystallinity index of about 0.65 or greater and about 70% or greater combined cubic and tetragonal crystal lattice structure in the absence of an effective amount of a crystal phase stabilizer.

In a preferred embodiment, the composite material has an index of refraction of about 1.6 or greater, more preferably about 1.66 or greater and most preferably about 1.75 or greater.

In a preferred embodiment the organic matrix material is a monomer, oligomer or polymer, for example, acrylates, methacrylates, epoxies, styrenes, polyolefins, polyesters, polyurethanes, polymethylmethacrylates, polystyrenes, polycarbonates, polyimides and mixtures thereof.

As used herein, with respect to the present invention, the terms listed below shall have the following meanings.

"associated particles" as used herein refers to a grouping of two or more primary particles that are aggregated and/or agglomerated.

"aggregation" as used herein is descriptive of a strong association between primary particles which may be chemically bound to one another. The breakdown of aggregates into smaller particles is difficult to achieve.

"agglomeration" as used herein is descriptive of a weak association of primary particles which may be held together by charge or polarity.

"dispersion index" as used herein refers to the hydrodynamic particle size of the zirconia particles in the sol divided by the primary particle size of the zirconia particles. Theoretically, the dispersion index for non-associated particles equals 1 with the dispersion index increasing as the degree of association between primary particles increases.

"hydrodynamic particle size" refers to the weight average particle size of the zirconia particles in the aqueous phase as measured by Photon Correlation Spectroscopy (PCS).

"primary particle size" as used herein refers to the size of a non- associated single crystal zirconia particle.

"sol" as used herein refers to a dispersion or suspension of colloidal particles in an aqueous phase.

"zirconia" as used herein refers to $ZrO_2$ and may also be known as zirconium oxide and as zirconium dioxide.

DETAILED DESCRIPTION

The zirconia sols and zirconia particles of the present invention possess several advantageous characteristics. For example, the zirconia particles have a small average primary particle size and are highly crystalline. Of the crystalline portion of the zirconia particles the predominate crystal lattice structures are cubic and tetragonal with the balance being monoclinic. Cubic and tetragonal crystal lattice structures promote the formation of low aspect ratio primary particles having a cube-like shape when viewed under an electron microscope. In the sol the primary particles exist in a substantially non-associated (i.e., non aggregated and non-agglomerated) form. The particle size, crystalline nature of the particles and freedom from association of the particles allows the production of high refractive index, high x-ray opacity transparent composite materials when the sols of the present invention are incorporated into organic matrix materials, for example, monomers, oligomers and/or polymers.

Primary Particle Size:

Zirconia sols of the present invention comprise a plurality of single crystal zirconia particles having an average primary particle size of about 20 nm or less, more preferably, having an average primary particle size ranging from about 7–20 mn. As used herein, the term "primary particle size" refers to the size of a non-associated single crystal zirconia particle. Primary particle size is determined by x-ray diffraction as described in Test Procedure 3.

Crystallinity:

Zirconia sols of the present invention comprise zirconia particles which are highly crystalline in nature. This is important in that crystalline zirconia has a higher refractive index and higher x-ray scattering capability than amorphous zirconia. Crystallinity of zirconia particles may be quantified, for example, using a crystallinity index. Crystallinity index is calculated by dividing the x-ray scattering intensity of the sample material by the x-ray scattering intensity of a known crystalline standard material, for example, calcium stabilized zirconium oxide. A specific test procedure for determining the crystallinity index of zirconia particles is set forth herein in Test Procedure 4. In zirconia sols of the present invention the zirconia particles have a crystallinity index of about 0.65 or greater as measured using Test Procedure 4. More preferably, the zirconia particles having a crystallinity index of about 0.75 or greater, most preferably about 0.85 or greater as measured using Test Procedure 4.

Of the crystalline portion of the zirconia particles, the predominate crystal lattice forms are cubic and tetragonal with a minor amount of monoclinic phase also being present. Due to the difficulty in separately quantifying cubic and tetragonal crystal lattice structures using x-ray diffraction, the two have been combined and are reported herein as combined cubic and tetragonal. Specifically, the zirconia particles comprise about 70% or greater combined cubic and tetragonal crystal lattice structure. More preferably, the zirconia particles comprise about 75% or greater combined cubic and tetragonal crystal lattice structure, and most preferably comprise about 85% or greater combined cubic and tetragonal crystal lattice structure. In each instance, the balance of the crystalline phase is in the monoclinic crystal lattice structure.

Due to their very small size, the zirconia particles exist in predominately cubic and tetragonal crystal lattice phases without need for an effective amount of a crystal phase stabilizer. As used herein the term "crystal phase stabilizer" refers to a material which may be added to stabilize zirconia in the cubic and/or tetragonal crystal lattice structure. Specifically, crystal phase stabilizers function to suppress transformation from the cubic and/or tetragonal phase to the monoclinic phase. Crystal phase stabilizers include, for example, alkaline-earth oxides such as MgO and CaO, rare earth oxides (i.e., lanthanides) and $Y_2O_3$. As used herein the term "an effective amount" refers to the amount of crystal phase stabilizer necessary to suppress transformation of zirconia from the cubic and/or tetragonal phase to the monoclinic phase. In a preferred embodiment, the zirconia particles comprise less than about 1 wt. % of a crystal phase stabilizer, more preferably less than about 0.1 wt. % of a crystal phase stabilizer.

Dispersion Index:

In zirconia sols of the present invention, the primary particles of zirconia exist in a substantially non-associated (i.e., non-aggregated and non-agglomerated) form. A quantitative measure of the degree of association between the primary particles in the sol is the dispersion index. As used herein the "dispersion index" is defined as the hydrodynamic particle size divided by the primary particle size. The primary particle size is determined using x-ray diffraction techniques as described in Test Procedure 3. Hydrodynamic particle size refers to the weight average particle size of the zirconia particles in the aqueous phase as measured by Photon Correlation Spectroscopy (PCS) (see, Test Procedure 5). If the primary particles are associated, PCS provides a measure of the size of the aggregates and/or agglomerates of primary particles in the zirconia sol. If the particles are non-associated, PCS provides a measure of the size of the primary particles. Accordingly, as the association between primary particles in the sol decreases the dispersion index approaches a value of 1. In zirconia sols of the present invention the primary zirconia particles exist in a substantially non-associated form resulting in a zirconia sol having a dispersion index ranging from about 1–3, more preferably ranging from about 1–2.5, and most preferably ranging from about 1–2.

Optical Transmission:

Zirconia sols of the present invention may be characterized in part as having a high optical transmission due to the small size and non-associated form of the primary zirconia particles in the sol. High optical transmission of the sol is an important characteristic in preparing transparent or translucent zirconia-filled composite materials. As used herein, "optical transmission" refers to the amount of light that passes through a sample (e.g., a zirconia sol of the present invention) divided by the total amount of light incident upon the sample and may be calculated using the following equation:

%Transmission=$(I/I_O)$ where: I is the light intensity passing though the sample; and $I_O$ is the light intensity incident on the sample.

Optical transmission may be determined using an ultraviolet/visible spectrophotometer such as that commercially available as Model 6-550 Pye Unicam (from Pye Unicam Ltd., Cambridge England).

For zirconia sols of the present invention having a percent zirconia of about 1.28 wt. %, the optical transmission is preferably about 70% or greater, more preferably about 80% or greater, and most preferably about 90% or greater when tested in accordance with Test Procedure 2. For zirconia sols of the present invention having a percent zirconia of about 10 wt. %, the optical transmission is preferably about 20% or greater, more preferably about 50% or greater, and most preferably about 70% or greater when tested in accordance with Test Procedure 2.

Method of Making Zirconia Sols:

Zirconia Precursor:

Suitable starting materials for preparing polyether acid zirconium salts include basic zirconium salts such as zirconium carboxylates and basic zirconium salts having counterions that may be displaced with carboxylic acids. Representative examples of basic zirconium salts having counterions that may be displaced with carboxylic acids include zirconium oxynitrate, zirconium oxychloride and zirconium carbonates. Basic zirconium salts are salts of zirconium wherein at least a portion of the cationic charge on the zirconium is compensated by hydroxide or an $O^{2-}$ anion. Because it is difficult in practice to determine whether the oxygen content in basic zirconium salts arises from bound hydroxide or $O^{2-}$, it is common to represent this oxygen content as simply oxygen. Thus, formula (1) set forth below is presented with bound water excluded for simplicity and represents a general formula for zirconium compounds that may be suitable as starting materials for preparing polyether acid zirconium salts.

$$ZrO_{(4-n/2)}(X)_n \qquad (1)$$

where: X is a carboxylic acid displaceable counterion; and n ranges from 0.5 to 4.

Representative examples of carboxylic acid displaceable counterions include carboxylates such as acetates, formates and propionates and other counterions such as nitrate, chloride, carbonate or a combination thereof. Zirconium alkoxides, although not formally zirconium salts, may be used as starting materials in the formation of the polyether acid zirconium after initial reaction with a suitable acid to form a basic zirconium salt.

A preferred starting material is an aqueous solution or sol of basic zirconium acetate having the general formula $ZrO_{(4-n/2)}(CH_3COO)_n$, where n ranges from about 1–2. In aqueous solutions, zirconium acetate probably exists as complex polynuclear zirconium cation. Processes for making zirconium acetate are well known in the art (see, for example, W. B. Blumenthal, "The Chemical Behavior of Zirconium", D. Van Nostrand Company, Princeton, N.J., pp. 311–338). Suitable zirconium acetate solutions comprise from about 5–40 wt. % as $ZrO_2$ and range from about 5–40 wt. % acetate. A preferred zirconium acetate sol starting material comprises $ZrO_{1.25}(C_2H_3O)_{1.5}$ at 20 wt. % $ZrO_2$ and is commercially available under the trade designation "Nyacol $ZrO_2(Ac)$" from Nyacol Products Corporation, Ashland, Mass.

Polyether Carboxylic Acid:

In a preferred process of the present invention a polyether acid zirconium salt is prepared by reacting, in an aqueous solution, a zirconium salt with a polyether carboxylic acid. As presently understood, the polyether carboxylic acid is believed to function to prevent association (i.e., agglomeration and/or aggregation) of the zirconia particles as they are formed during the hydrolysis reaction. In this way, the zirconia particles produced according to the process of the present invention are substantially non-associated.

Polyether carboxylic acids suitable for use as modifiers in the present invention are water soluble monocarboxylic acids (i.e., containing one carboxylic acid group per molecule) having a polyether tail. The polyether tail comprises repeating difunctional alkoxy radicals having the general formula —O—R—. Preferred R groups have the general formula —$C_nH_{2n}$— and include, for example, methylene, ethylene and propylene (including n-propylene and i-propylene) or a combination thereof. Combinations of R groups may be provided, for example, as random, or block type copolymers.

A preferred class of monovalent polyether radicals may be represented generally by formula (3):

$$CH_3\text{—}[O\text{—}(CH_2)_y]_x\text{—}X\text{—}COOH \qquad (3)$$

where:
X is a divalent organic linking group;
x ranges from about 1–10; and
y ranges from about 1–4.

Representative examples of X include —$X_2$—$(CH_2)_n$— where $X_2$ is —O— —S—, —C(O)O—, —C(O)NH— and wherein n ranges from about 1–3.

Examples of preferred polyether carboxylic acids include 2-[2-(2-methoxyethoxy)ethoxy] acetic acid having the chemical structure $CH_3O(CH_2CH_2O)_2CH_2COOH$ (hereafter MEEAA) and 2-(2-methoxyethoxy) acetic acid having the chemical structure $CH_3OCH_2CH_2OCH_2COOH$ (hereafter MEAA). MEAA and MEEAA are commercially from Aldrich Chemical Co., Milwaukee, Wis. as catalog numbers 40,701-1 and 40,700-3, respectively. It is also within the scope of this invention to utilize a mixture of more than one polyether carboxylic acid.

Reaction of the polyether carboxylic acid with a zirconium salt following reaction sequence (1):

$$ZrO_{(4-n/2)}(X)_n + a\ R_2\text{—}COOH \rightarrow ZrO_{(4-n/2)}(X)_{n-a}(R_2COO)_a + a\ HX \qquad (1)$$

results in the formation of a polyether acid zirconium salt having the general formula $ZrO_{(4-n/2)}(X)_{n-a}(R_2COO)_a$ and liberates (i.e., releases) approximately a stochiometric amount of an acid having the general formula HX. By way of example, when the zirconium salt comprises zirconium acetate $(ZrO_{(4-n/2)}(C_2H_3O_2)_n)$ a near stochiometric amount of acetic acid $(C_2H_3O_2H)$ is released as a result of the formation of the polyether acid zirconium salt (see, reaction sequence 1a).

(1a)

Salts of zirconium with carboxylic acids are not dissociated in the aqueous phase as the acid is bound to the zirconium atom. The carboxylic acid effects the water solubility of the salt. Attachment of hydrophobic acids (e.g., alkyl acids) to the zirconium causes the salts to be insoluble in water. In fact, even the addition of small acids such as propionic acid and acrylic acid cause the salt to be insoluble in water. In contrast, the polyether acids used in the present invention allow higher molecular weight acids to be used while maintaining the water solubility of the polyether acid zirconium salt. This in turn allows hydrothermal treatment of the dissolved polyether acid zirconium salt in the aqueous phase.

Typically, relative to the zirconium salt starting material, the polyether carboxylic acid is added in an amount ranging from about 2.5–5.0 millimoles per gram equivalent of $ZrO_2$ in the zirconium salt. For the preferred zirconium acetate starting material (i.e., Nyacol $ZrO_2(Ac)$), this range results in the displacement of about 20–50% of the acetate groups. Preferably, the amount of polyether carboxylic acid added should be limited to the minimum amount necessary to prevent association of the resulting zirconia particles. In this way, the amount of acid released during formation of the polyether acid zirconium salt is kept to a minimum. The amount of polyether carboxylic acid added may depend upon such factors as, for example, the molecular weight of the polyether carboxylic acid, the concentration, time and temperature during the hydrolysis reaction.

Typically, the polyether carboxylic acid is added to an aqueous solution of the zirconium salt and the resulting solution is stirred at room temperature for about 30–60 minutes. The polyether carboxylic acid molecules react with the zirconium salt displacing and substituting for at least a portion of the acid groups bound to the zirconium salt. The displaced acid groups are released into the solution as free acid. It will ordinarily be preferred to remove at least a portion of the acid, more preferably substantially all of the acid released during the formation of the polyether acid zirconium salt. It should be noted that removal of the acid may function to shift the reaction equilibrium towards formation of the polyether acid zirconium salt. Suitable techniques for removing the excess acid are known in the art and include, for example, drying or distillation. When the liberated acid has a low boiling point (e.g., <about 175° C.), it may be removed by heating the solution until the aqueous phase evaporates leaving a residue of the polyether acid zirconium salt. The polyether acid zirconium salt must then be dissolved in water prior to hydrolysis.

Hydrolysis:

After formation of the polyether acid zirconium salt and, preferably, removal of the liberated acid, the next step is to hydrolyze an aqueous solution of the polyether acid zirconium salt under conditions sufficient to convert the polyether acid zirconium salt into crystalline zirconia particles. By way of example, when the polyether acid zirconium salt is derived from the acetate salt (see, reaction sequence 1a), the hydrolysis step follows general reaction sequence (2a):

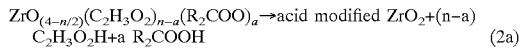
(2a)

The hydrolysis reaction forms acid modified zirconia particles and also produces free carboxylic acids (i.e., $C_2H_3O_2H$ and $R_2COOH$) as a by product. Therefore, the resultant zirconia sol comprises the acid modified zirconia particles and a mixture of two carboxylic acids in water. By acid modified zirconia particles it is meant that at least a fraction of the acids are adsorbed to the surface of the zirconia particles.

The hydrolysis reaction of the polyether acid zirconium salt solution may take place in any suitable reaction vessel. Since the reaction is typically performed under high temperatures and pressures, an autoclave will generally be the preferred type of reaction vessel. One example of a preferred reaction vessel is commercially available as Pressure Reactor Series #4520" from Parr Instruments Co., Moline, Ill.

In operation, an aqueous solution of the polyether acid zirconium salt is first charged into a reaction vessel. The concentration of the polyether acid zirconium salt solution is typically in the range of 0.5–3 wt. % $ZrO_2$, preferably in the range of 1–2 wt. % $ZrO_2$. However, the concentration may be varied through a wider range depending upon the other reaction conditions. The polyether acid zirconium salt solution is then heated to a temperature sufficient to convert it into zirconia particles. Preferred hydrolysis temperatures range from about 140–250° C., more preferably ranging from about 150–200° C. Typically the reaction vessel is heated to the desired hydrolysis temperature over a period of several hours. Among other considerations, a suitable hydrolysis temperature or temperature range, may be selected in order to minimize degradation and/or decomposition of the polyether carboxylic acid. The pressure maintained in the reaction vessel may be the autogenous pressure (i.e., the vapor pressure of water at the temperature of the reaction) or, preferably, the reaction vessel may be pressured, for example, with an inert gas such as nitrogen. Preferred pressures range from about 1–30 bars, more preferably 2–20 bars. Pressurization of the reaction vessel is believed to reduce or eliminate refluxing of the polyether acid zirconium salt solution within the reaction vessel which may deleteriously affect the properties of the resulting zirconia sol. The time of hydrolysis is typically a function of the hydrolysis temperature and the concentration of the salt solution. Heat is typically applied until the hydrolysis reaction is substantially complete. Generally, the time involved is in the range of about 16–24 hours at a temperature of about 175° C., however, longer or shorter times may also be suitable. The reaction may be monitored by examining the resulting zirconia particles using x-ray diffraction or by examining the amount of free acid in the water phase using IR spectroscopy or HPLC. Upon completion of the hydrolysis, the pressure vessel is allowed to cool and the resulting zirconia sol is removed from the reaction vessel. Although the procedure described above is a batchwise process, it is also within the scope of this invention to conduct the hydrolysis in a continuous process.

Post-Treatment of Zirconia Sols:

Zirconia sols of the present invention may be concentrated by removing at least a portion of the liquid phase using techniques well known in the art, for example, evaporation or ultra-filtration. In a preferred method the zirconia sols are concentrated to about 10–40 wt. % $ZrO_2$ using a rotary evaporator.

Zirconia sols prepared in accordance with the method of the present invention typically contain an excess of acid over that normally desired (see, reaction sequence 2a). When it is desired to combine a zirconia sol of the present invention with an organic matrix material, for example, an organic monomer, it will ordinarily be necessary to remove at least a portion of, more preferably substantially all of, the free acid present in the sol. Typically, the acid may be removed by such conventional methods as drying, dialysis, precipitation, ion exchange, distillation or diafiltration.

Due to the formation of free acid during the hydrolysis reaction, the pH of the as prepared zirconia sols typically ranges from about 1.8–2.2. Dialysis may be used to increase the pH of the sols. Dialyzed sols typically have a pH ranging about 1–4.5, or greater, depending upon the extent of the dialysis. The pH of the sols may also be adjusted by the addition of acids (e.g., concentrated HCl and glacial acetic) and/or base (e.g., aqueous ammonia). Addition of aqueous ammonia has resulted in clear sol to at least pH 6–7.

Dialysis, ion exchange and diafiltration methods may be used to remove the free acid without substantially changing the ratio of the acids adsorbed to the surface of the zirconia particles. Alternatively, removal of excess acid and concentration of the sol may be achieved by first evaporating the water and free acid from the sol to obtain a dry powder. The dry powder may then be redispersed in a desired amount of water to obtain a concentrated sol substantially free of excess acid. It should be noted, however, that this technique may change the ratio of the acids adsorbed to the surface of the zirconia particles in such a way that the ratio of the higher boiling acid to the lower boiling acid is increased.

Optionally, after formation of the zirconia sol, the polyether carboxylic acid groups may be removed or displaced from the zirconia particles of the sol. Removal of the polyether carboxylic acid groups may be advantageous, for example, when the polyether groups would be incompatible with an organic matrix material to which it is desired to add the zirconium sol. Displacement of the polyether carboxylic acid groups may be accomplished, for example, by displacing the polyether acid from the zirconia particles with a carboxylic acid, for example, acetic acid. The carboxylic acid displaces and substitutes for the polyether carboxylic acid groups on the zirconia particles. After displacement, the free polyether carboxylic acid may be removed from the sol using techniques known in the art, for example, dialysis or diafiltration.

Surface Modification:

In some instance it may be desirable to combine a zirconia sol of the present invention with an organic matrix material, for example a monomer, oligomer and/or polymer. The zirconia particles may be added to a organic matrix materials to provide matrix materials having increased index of refraction and increased radiopacity. Specifically, the zirconia particles may provide increased index of refraction and/or increased radiopacity without detrimentally affecting the optical transmission of the organic matrix.

Generally it will be necessary to surface modify the zirconia particles in order to provide compatibility with an organic matrix material. Surface modification involves reacting the zirconia particles with a surface modification agent or combination of surface modification agents that attach to the surface of the zirconia particles and which modify the surface characteristics of the zirconia particles to provide increased compatibility with the organic matrix material.

Surface modification agents may be represented by the formula A-B where the A group is capable of attaching to the surface of a zirconia particle, and where B is a compatibilizing group which may be reactive or non-reactive with the organic matrix. Groups capable of attaching, via adsorption, to the surface of a zirconia particle include, for example, acids such as carboxylic acids, sulfonic acids, phosphonic acids and the like. Compatibilizing groups B which impart polar character to the zirconia particles include, for example, polyethers.

Representative examples of polar modifying agents having carboxylic acid functionality include MEEAA, MEAA and mono(polyethylene glycol)succinate. Compatibilizing groups B which impart non-polar character to the zirconia particles include, for example, linear or branched aromatic or aliphatic hydrocarbons. Representative examples of non-polar modifying agents having carboxylic acid functionality include octanoic acid, dodecanoic acid and oleic acid. Modifying agents reactive with the organic matrix include, for example, acrylic acid, methacrylic acid and mono-2-(methacryloxyethyl)succinate. A useful surface modification agent which imparts both polar character and reactivity to the zirconia particles is mono (methacryloxypolyethyleneglycol) succinate. This material may be particularly suitable for addition to radiation curable acrylate and/or methacrylate organic matrix materials.

Generally, the surface modification may be accomplished by simple addition of a surface modifying agent to a zirconia sol of the present invention. Optionally, a water miscible cosolvent may be used to increase the solubility of the surface modifying agent and/or compatibility of the surface modified particles in the aqueous phase. Suitable cosolvents include water-miscible organic compounds, for example, methoxy-2-propanol or N-methyl pyrrolidone. When the surface modification agents are acids, the modification of the zirconia particles typically does not require elevated temperatures.

Various methods may be employed to combine the zirconia sol of the present invention with an organic matrix material. In one aspect, a solvent exchange procedure may be utilized. In the solvent exchange procedure the organic matrix material is first added to the surface modified sol. Optionally, prior to addition of the organic matrix material, a cosolvent such as methoxy-2-propanol or N-methyl pyrolidone may be added to the zirconia sol to help miscibilize the organic matrix material in the water. After addition of the organic matrix material, the water and cosolvent (if used) are removed via evaporation, thus leaving the zirconia particles dispersed in the organic matrix material. The evaporation step may be accomplished for example, via distillation, rotary evaporation or oven drying.

Alternatively, another method for incorporating a zirconia sol of the present invention into an organic matrix material involves drying of the zirconia particles to produce a powder followed by the addition of the organic matrix material into which the particles are dispersed. The drying step may be accomplished by conventional means such as oven drying or spray drying. In another aspect, conventional oven drying can be performed at between about 70° C. to 90° C. for about 2 to 4 hours.

Alternatively, another method of incorporating a zirconia sol of the present invention into an organic matrix material involves first surface treating the zirconia particles with a non-polar carboxylic acid, for example, oleic acid. The non-polar acid surface modifies the zirconia particles causing them to flock into a filterable mass. The particles may then be separated from the liquid phase via filtration, optionally dried, and combined with the organic matrix material.

In yet another method the surface modified particles can be extracted into a water immiscible solvent or monomer, for example, toluene, hexane, ethyl acetate or styrene.

The sols of the present invention may be combined with organic matrix materials, for example, monomers, oligomers and polymers by the various techniques discussed above. The resultant composite material can have the properties of optical clarity, high refractive index and high radiopacity combined with high modulus, hardness, and the processibility and flexibility of the polymer matrix. Suitable materials for incorporated zirconia sols of the present invention include, for example, dental materials as described in U.S. Ser. No. 09/428,937 "Dental Materials With Nano-Sized Silica Particles" (filed on Oct. 28, 1999) and U.S. Ser. No. 09/428,185 "Radiopaque Dental Materials With Nano-Sized Particles" (filed on Oct. 28, 1999), the disclosures of which are incorporated herein by reference. In general, the refractive index of a composite material increases linearly with volume fraction of the zirconia particles in the organic matrix. To obtain a high index of refraction, an organic matrix material having a high index of refraction is generally preferred. Zirconia particles from the zirconia sol of the present invention may be used to further increase the refractive index of the organic matrix. When combined with an organic matrix material the resulting composite materials may achieve a refractive index of about 1.6 or greater, more preferably about 1.66 or greater and most preferably about 1.75 or greater.

Representative examples of polymerizable monomers include acrylates, methacrylates, styrenes, epoxies and the like. Also, reactive oligomers such as acrylated or methacrylated polyesters, polyurethanes or acrylics may also be used. The resulting composite material may be shaped or coated and then polymerized, for example, via a free-radical photopolymerization mechanism. Photopolymerization may be initiated by the use of a photoinitiator such as that commercially available under the trade designation "IRGACURE 184" (Ciba Specialty Chemicals, Tarrytown, N.Y.). The sols of the present invention may also be combined with other types of polymers, for example, polyolefins, polyesters, polyurethanes, polymethylmethacrylates, polystyrenes, polycarbonates and polyimides. Suitable techniques for combining the sol with a thermoplastic polymer include, for example, extrusion, milling or brabender mixing. Surface modification agents should be selected to be stable at the desired processing temperature.

EXAMPLES

Test Procedure 1: Percent $ZrO_2$

The weight percent zirconia, in the sols of the present, invention was determined by gravimetric analysis ing a TA Instruments 2950 TGA (Thermogravimetric analyzer). Analysis were completed by heating a 30 to 60 mg sample of the sample sol in an air to 900° C. to volatilize all organic materials, leaving only the inorganic $ZrO_2$. Alternatively the total solids content ($ZrO_2$ and adsorbed acid) was determined by solids dry down at 80C for 16 hr, followed by TGA of the dried solids to determine the $ZrO_2$ content of the solids. The weight loss of the samples was essentially complete between 500–600° C.

Test Procedure 2: Optical Transmission

Optical transmission of the sol sample was determined by measuring the transmission of a of a known wt. % $ZrO_2$ solution of the sol in deionized water at 600 nm, using a standard polystyrene cuvette (1 cm path length) in a Model 6-550 Pye Unicam UV/V spectrophotometer (available from Pye Unicam Ltd (Cambridge, England). The % transmission was adjusted to 100% using a cuvette filled with deionized water. The reported optical transmission measurement is transmission relative to distilled water.

The optical transmission of free standing films was determined by measuring the transmission through a film sample of known thickness at 600 nm using a Model 6-550 Pye Unicam UV/V spectrophotometer. The spectrophotometer was first calibrated to 100% transmission against air.

Test Procedure 3: Crystallite Particle Size and Crystal Form Content

Particle size of dried zirconia sample was reduced by hand grinding using an agate mortar and pestle. A liberal amount of the sample was applied by spatula to a glass microscope slide on which a section of double coated tape had been adhered and pressed into the adhesive on the tape by forcing the sample against the tape with the spatula blade. Excess sample was removed by scraping the sample area with the edge of the spatula blade, leaving a thin layer of particles adhered to the adhesive. Loosely adhered materials remaining after the scraping were remove by forcefully tapping the microscope slide against a hard surface. In a similar manner, corundum (Linde 1.0 $\mu$m alumina polishing powder, Lot Number C062, Union Carbide, Indianapolis, Ind.) was prepared and used to calibrate diffractometer for instrumental broadening.

X-ray diffraction scans were obtained from by use of a diffractometer employing copper $K_\alpha$ radiation and Inel CPS120 (Inel Inc, Stratham, N.H.) position sensitive detector registry of the scattered radiation. The detector has a nominal angular resolution of 0.03 degrees (2θ) and received scattering data from 0 to 115 degree (2θ). The X-ray generator was operated at a setting of 40 kV and 10 mA and fixed incident beam slits were used. Data was collected for 60 minutes at a fixed take-off (incident) angle of 6 degrees. Data collections for the corundum standard were conducted on three separate areas of several individual corundum mounts. Data was collected on three separate areas of the thin layer sample mount.

Observed diffraction peaks were identified by comparison to the reference diffraction patterns contained within the ICDD powder diffraction database (sets 1–47, International Center for Diffraction Data, Newton Square, Pa.) and attributed to either cubic/tetragonal (C/T) or monoclinic (M) forms of zirconia. The amounts of each zirconia form were evaluated on a relative basis and the form of zirconia having the most intense diffraction peak was assigned the relative intensity value of 100. The strongest line of each of the remaining crystalline zirconia forms were scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting observed diffraction peaks. The following peak widths were evaluated depending on the zirconia phase found to be present:

cubic/tetragonal (C/T): (1 1 1)

monoclinic (M): (−1 1 1), and (1 1 1)

Peak widths were found as the peak full width at half maximum (FWHM) having units of degrees using a Pearson VII peak shape model, with $K_{\alpha 1}$ and $K_{\alpha 2}$ wavelength components accounted for, and linear background model. The profile fitting was accomplished by use of the capabilities of the JADE (version 3.1, Materials Data Inc., Livermore, Calif.) diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. Corrected sample peak width (β)

were used to evaluate primary crystal (crystallite) size by application of the Scherrer equation. The arithmetic mean of the cubic/tetragonal (C/T) and monoclininc phases (M) were calculated.

$\beta$=[calculated peak FWHM−instrumental breadth](converted to radians)

Crystallite Size (D)=K$\lambda$/$\beta$(cos $\theta$)

where: K=form factor (here 0.9);
$\lambda$=wavelength (1.540598 Å);
$\beta$=calculated peak width after correction for instrumental broadening (in radians); and
$\theta$=½ the peak position (scattering angle).

Cubic/Tetragonal Mean Crystallite Size=[D(1 1 1)$_{area\ 1}$+ D(−1 1 1)$_{area\ 2}$+D(1 1 1)$_{area\ 3}$]/3

Monoclinic Mean Crystallite Size=[D(−1 1 1)$_{area\ 1}$+ D(−1 1 1)$_{area\ 2}$+D(−1 1 1)$_{area\ 3}$+D(1 1 1)$_{area\ 1}$+ D(1 1 1)$_{area\ 2}$+D(1 1 1)$_{area\ 3}$]/6

The crystallite size is reported in the format:
[C/T crystallite size](parts C/T)+[M crystallite size](parts M)

Weighted average=[(% C/T)(C/T size)+(% M)(M size)]/100 where: % C/T=the percent crystallinity contributed by the cubic and tetragonal crystallite content of the $ZrO_2$ sol;
C/T size=the size of the cubic and tetragonal crystallites;
% M=the percent crystallinity contributed by the monoclinic crystallite content of the $ZrO_2$ sol; and
M size=the size of the monoclinic crystallites.

Test Procedure 4: Crystallinity Index

Particle size of the phase standard (zirconium oxide, calcium stabilized Z-1083 Lot Number 173077-A-1, CERAC Inc, Milwaukee, Wis.) was reduced by ball milling and/or hand grinding using a boron carbide mortar and pestle to pass 325 mesh sieve. Individual mixtures were prepared consisting of 0.400 grams of sample and 0.100 grams of mass standard, a material incorporated into samples being evaluated for crystallinity index to normalize X-ray intensity values based on amount of material present in a sample. Tungsten metal powder (<3 $\mu$m) was the mass standard used. Mixtures of the samples were blended under ethanol using an agate mortar and pestle and allowed to dry under flowing nitrogen. A similar mixture composed of the phase standard was also prepared to serve as the crystallinity index reference. The dried mixtures were removed from the mortar and pestle by spatula and fine brush and subsequently transferred to individual sample containers. Portions of each sample were prepared as ethanol slurries on sample holders containing flush mounted glass inserts. Multiple X-ray diffraction scans (a minimum or 10 scans for both sample and standard) were obtained from each sample and phase standard mixture by use of a vertical Bragg-Bretano diffractometer (constructed by Philips Electronic Instruments, Mahwah, N.J.) employing copper $K_\alpha$ radiation, variable incident slit, fixed exit slit, graphite diffracted beam monochromator, and proportional counter registry of the scattered radiation. Scans were conducted from 25–55 degree (2$\theta$) employing a 0.04 degree step size. A 8 second dwell time was used for standard mixture while a 20 second dwell time was employed for sample mixtures to improve counting statistics. The X-ray generator (Spellman High Voltage Electronics Corporation, Hauppage, N.Y.) was operated at a setting of 40 kV and 20 mA. Peak areas for the observed diffraction maxima due to zirconia and tungsten phases were measured by profile fitting observed diffraction peaks within the 25–55 degree (2$\theta$) scattering angle range. The following peak areas were evaluated depending on the zirconia phase found to be present:

| | |
|---|---|
| cubic (C) | (1 1 1), (2 0 0), and (2 2 0) |
| tetragonal (T) | (1 0 1), (0 0 2)/(1 1 0), and (1 1 2)/(2 0 0) |
| monoclinic (M) | (-1 1 1), (1 1 1), (0 0 2), (0 2 0), and (2 0 0) |

The X-ray scattering of internal mass standard was evaluated by measurement of cubic tungsten (1 1 0) peak area. A Pearson VII peak shape model and linear background model were employed in all cases. The profile fitting was accomplished by use of the capabilities of the JADE (version 3.1, Materials Data Inc. Livermore, Calif.) diffraction software suite. The peak areas of zirconia peaks outlined above were summed to produce a total zirconia scattered intensity value [(Zirconia Area)$_{sample}$] for each sample as well as standard [(Zirconia Area)$_{standard}$]. These total zirconia scattered intensity values were divided by respective cubic tungsten (1 1 0) peak areas to produce the ratio [$R_{sample}$] for each sample as well as the phase standard [$R_{standard}$]. The arithmetic mean of $R_{sample}$ and $R_{standard}$ are calculated using individual values obtained from the multiple runs of sample and standard, respectively. The crystallinity index [$X_c$] for each sample was calculated as the ratio of $R_{sample\ (mean)}$ to $R_{standard(mean)}$.

$R_{sample\ (i)}$=[(Total Zirconia Area)$_{sample}$]/[(Tungsten Area)$_{sample}$]

$R_{standard\ (i)}$=[Total Zirconia Area)$_{standard}$]/[(Tungsten Area)$_{standard}$]

$R_{sample\ (mean)}$=[$\Sigma R_{sample\ (i)}$]/$N_{sample}$ where $N_{standard}$=number of sample scans $R_{standard\ (mean)}$=[$\Sigma R_{standard\ (i)}$]/$N_{standard}$ where $N_{standard}$=number standard scans $X_c$=$R_{sample\ (mean)}$/$R_{standard\ (mean)}$ Test Procedure 5: Photon Correlation Spectroscopy The weight average mean particle diameter of the zirconia particles was determined by Photon Correlation Spectroscopy using a Coulter N4 Submicron Particle Sizer (available from Coulter Corporation, Miami Fla.). Dilute zirconia sol samples were filtered through a 0.45 $\mu$m filter using syringe-applied pressure into a glass cuvette. The remaining volume of the cuvette was filled with water, covered, and repeatedly inverted to remove air bubbles. The cuvette was wiped down to remove fingerprints and dust prior to taking any measurements. Light scattering intensity was measured to ensure that an appropriate concentration of sol was sampled. If the intensity was too high, a portion of the cuvette's contents was removed and the remaining contents diluted with water. If the intensity was too low, several more drops of filtered sol were added to the sample and the solution mixed by repeatedly inverting the cuvette. Prior to starting data acquisition the temperature of the sample chamber was allowed to equilibrate for 5 minutes at 25° C. The supplied software was used to do a SDP analysis (1.0 nm–1000 nm) with an angle of 90°. The analysis was performed using 25 data bins. The following values were used in the calculations: refractive index of water=1.333, viscosity of water 0.890 cP, and referactive index for zirconia particles=1.9. Data acquisition immediately ensued for a period of 3:20 minutes. The reported PCS number is the mean diameter based on weight analysis that results from this procedure.

Test Procedure 6: Refractive Index

The refractive index of the zirconia containing materials were measured on an Abbe refractometer, commercially available from Fisher Scientific, Pittsburgh, Pa.

Test Procedure 7: Diametral Tensile Strength (DTS) and Compressive Strength (CS) Testing DTS and CS measurements were made according to ADA ("American Dental Association") specification No. 9 and ADA specification No. 27 respectively of ISO-test procedure 4049 (1988). Specifically, for determination of compressive strength ("CS") and diametral tensile strength ("DTS"), the composition was packed into a 4 mm inside diameter glass tube, capped with silicone rubber plugs and axially compressed at about 0.28 MPa for 15 minutes, then light cured for 80 seconds by exposure to two oppositely-disposed Visilux units. Each sample was then irradiated for 90 seconds using a Dentacolor XS unit (Kulzer, Inc., Germany). Hardened samples were cut on a diamond saw to form cylindrical plugs 8 mm long for measurement of CS and 2 mm long for measurement of DTS. The plugs were stored in distilled water at 37° C. for 24 hours. CS and DTS values for each composition were measured using a force testing apparatus available under the trade designation "INSTRON" (Instron 4505, Instron Corp. Canton, Mass.).

The compressive strength (CS) of these samples was tested on an Instron with 10 kN load cell. A total of 5 cylinders of hardened composite with about 8 mm length and 4mm diameter were prepared.

The Diametral Tensile Strength (DTS) of these samples was tested on an Instron with 10 kN load cell. A total of 5 cylinders of hardened composite with about 2.2 mm length and 4mm diameter were prepared.

Test Procedure 8: Visual Opacity & Radiopacity Determination

Disc-shaped 1 mm thick by 20 mm diameter samples of the composite were cured by exposing them to illumination from an Visilux 2™ (3M Co, St. Paul, Minn.) curing light for 60 seconds on each side of the disk at a distance of 6 mm. The hardened composite samples were then evaluated for visual opacity and radiopacity as follows.

Hardened composite samples were measured for direct light transmission by measuring transmission of light through the thickness of the disk using a MacBeth transmission densitometer Model TD-903 equipped with a visible light filter, available from MacBeth (MacBeth., Newburgh & N.Y.).

For radiopacity evaluation, the procedure used followed the ISO-test procdeure 4049 (1988). Specifically, hardened composite samples were exposed to radiation using a Gendex GX-770 dental X-ray (Milwaukee, Wis.) unit for 0.73 seconds at 7 milliamps and 70 kV peak voltage at a distance of about 400 mm. The X-ray negative was developed using a Air Techniques Peri-Pro automatic film processor. (Hicksville, N.Y.).

Material List

Nyacol $ZrO_2(Ac)$: a zirconium acetate sol with a Zr:AcOH ratio 1:1.5, (20 wt. % as zirconia in water) available from Nyacol Products Corporation an affiliate of the PQ Corporation (Ashland, Mass.).

MEEAA: 2[2-(2-methoxyethoxy)ethoxy]acetic acid commercially available from Aldrich Chemical Co., Milwaukee, Wis. under catalog number 40,701-7.

MEAA: 2-(2-methoxyethoxy)acetic acid commercially available from Aldrich Chemical Co., Milwaukee, Wis. under catalog number 40,700-3.

EXAMPLE 1

A polyether acid zirconium salt was prepared as follows: Nyacol $ZrO_2(Ac)$ (150 g) and MEEAA (26.95 g, 5 mmole/g $ZrO_2$) were charged into a liter beaker and the resulting mixture stirred at room temperature (approximately 22° C.) for 30 minutes. Water and excess acetic acid were removed and the polyether acid zirconium salt was isolated as a dry solid (67.15 g) by allowing the reaction mixture to evaporate at room temperature for 2 days in an evaporating dish, followed by drying in a circulating air oven maintained at approximately 90° C. for approximately 5 hours. A portion of the polyether acid zirconium salt (45 g) was dissolved in deionized water (1455 g) to produce a clear polyether acid zirconium salt solution (1500 g). A portion of the polyether acid zirconium salt solution (1354 g) was poured into a 2 liter, unstirred, stainless steel Parr Reactor (available from Parr Instrument Company, Ill) and the autoclave pressurized to about 2.75 bars (40 psi) with nitrogen to keep the liquid contents from refluxing during the subsequent heating cycle. The autoclave was subsequently heated to 100° C. in approximately 30 minutes, then to 150° C. over a period of approximately two hours, and finally to 175° C. (12 bars) and maintained at that temperature for 24 hours, after which the autoclave was cooled and depressurized over a period of 2–3 hr. The zirconia sol of the present invention was obtained as a clear liquid with an opalescent blue color with no sediment.

The X-ray diffraction spectrum (Test Procedure 3) of the zirconia particles showed [$ZrO_2$ (C,T) (9.0 nm)]100+[$ZrO_2$ (M) (9.0 nm)]13 and Photon Correlation Spectroscopy (Test Procedure 5) gave a weight average mean particle diameter of 13.1 nm. Additional properties of the zirconia sol are presented in Table 1.

The sol of Example 1 was also concentrated to about 20 wt. % $ZrO_2$. Excess MEEAA was first removed from the sample by dialysis using Spectra/Por membrane tubing (MWCO of 3500, available from Fisher Scientific (Pittsburgh, Pa.). The zirconia sol was poured into a 25–30 cm length of the tubing, the ends of tube clipped to prevent leaking, and the tube immersed in a beaker of deionized water. The water was changed every hour. Free acid removal, which was tracked using IR measurements, required approximately 6 hours of dialysis. The dialyzed sol which was subsequently concentrated to 37 wt. % $Zro_2$ by vacuum distillation and its optical transmission (Test Procedure 2) determined to be 70%.

A portion of the as prepared sol was dried at 85° C. for approximately 16 hours in a circulating air oven. The $ZrO_2$ content of the solid was determined to be 87.16 wt. % $ZrO_2$, evaluated by TGA to 600° C., the remainder of the weight being surface adsorbed acids. The X-ray scattering intensity for this material, measured according to Test Procedure 4 produced a value of 1.751/0.8716=2.0089. The ratio of this to the value of 2.340 obtained for the standard material (see, Test Procedure 4) was used to determine the crystallinity index of 0.8585.

EXAMPLE 2

A polyether acid zirconium salt was prepared as follows: Nyacol $ZrO_2(Ac)$ (150 g) and MEAA (20.22 g, 5 mmole/g $ZrO_2$) were charged to a 1 liter beaker and the resulting mixture stirred at room temperature (approximately 22° C.) for 60 minutes. The mixture was poured into two large crystallization dishes and dried at room temperature for about 18 hr to remove water and excess acetic acid, producing a dry solid. A portion of the polyether acid zirconium salt (40.6 g) was dissolved in deionized water (1459.4 g) to produce a clear polyether acid zirconium salt solution (1500 g). A portion of the polyether acid zirconium salt solution (1329.8 g) was poured into a 2 liter, unstirred stainless steel Parr Reactor and the autoclave pressurized to about 2.75 bars (40 psi) with nitrogen. The autoclave was subsequently heated to 100° C. in approximately 40 minutes and then to 175° C. (12 bars) and maintained at that temperature for about 21 hr. The autoclave was cooled and depressurized over a period of 1–3 hr. The resultant zirconia sol of the present invention was obtained as a clear liquid with an opalescent blue color.

The sol was concentrated to about 20 wt. % $ZrO_2$ by rotary evaporation (~85° C.) to obtain a clear stable sol. The X-ray diffraction spectrum (Test Procedure 3) of the zirconia particles showed [$ZrO_2$ (C,T) (10.5 mn)]100+[$ZrO_2$(M) (12 nm)]31 and Photon Correlation Spectroscopy (Test Procedure 5) gave a weight average mean particle diameter of 18.4 nm. Additional properties of the zirconia sol are presented in Table 1.

EXAMPLE 3

A polyether acid zirconium salt was prepared as follows:

Nyacol $ZrO_2$(Ac) (150 g) and MEEAA (13.44 g, 2.5 mmole/g $ZrO_2$) were charged to a 1 liter round bottom flask and the resulting mixture stirred at room temperature (approximately 22° C.) for 30 minutes. Water and excess acetic acid were removed by rotary evaporation at 85° C. for 2.5 hr producing a dry solid (60.99 g). The polyether acid zirconium salt (60.99 g) was dissolved in deionized water (2282.7 g) to produce a clear polyether acid zirconium salt solution (2343.7 g).

A portion of the polyether acid zirconium salt solution (1339.6 g) was poured into a 2 liter, unstirred, stainless steel Parr Reactor and the autoclave pressurized to about 2.75 bars (40 psi) with nitrogen. The autoclave was subsequently heated to 100° C. in approximately 30 minutes, to 150° C. over a period of approximately 1.5 hours, and finally to 175° C. (12 bars) and maintained at that temperature for 19 hours. The autoclave was cooled and depressurized over a period of 2–3 hr. The zirconia sol of the present invention was obtained as a clear liquid with an opalescent blue color and a slight white haze.

The sol was concentrated to about 20 wt. % $ZrO_2$ by rotary evaporation (~85° C.) to obtain a clear stable sol. The X-ray diffraction spectrum (test Procedure 3) of the zirconia particles showed [$ZrO_2$ (C,T) (9.0 nm)]100+[$ZrO_2$(M) (9.0 nm)]22 and Photon Correlation Spectroscopy (Test Procedure 5) gave a weight average mean particle diameter of 21.7 nm. Additional properties of the zirconia sol are presented in Table 1.

EXAMPLE 4

A polyether acid zirconium salt was prepared as follows:

Nyacol $ZrO_2$(Ac)) (200 g) and MEAA (13.52 g, 2.5 mmole/g $ZrO_2$) were charged to a 1 liter beaker and the resulting mixture stirred at room temperature (approximately 22° C.) for 30 minutes. Water and excess acetic acid were removed and the polyether acid zirconium salt was isolated as a dry solid (73.87 g) by allowing the reaction mixture to evaporate in an evaporation dish in a circulating air oven maintained at 85° C. for about 24 hr. The polyether acid zirconium salt (73.87 g) was dissolved in deionized water (3051.9 g) to produce a clear polyether acid zirconium salt solution (3125.8 g). A portion of the polyether acid zirconium salt solution, prepared above, (1672.6 g) was poured into a 2 liter, unstirred, stainless steel Parr Reactor and the autoclave pressurized to about 2.75 bars (40 psi) with nitrogen. The autoclave was subsequently heated to 100° C. in approximately 2 hr, to 150° C. over a period of approximately two hours, and finally 175° C. (12 bars) and maintained at that temperature for about 19 hours. The autoclave was cooled and depressurized over a period of 2–3 hr. The zirconia sol of the present invention was obtained as a clear liquid with an opalescent blue color and a slight white haze.

The sol was concentrated to about 20 wt. % $ZrO_2$ by rotary evaporation (~85° C.) to obtain a clear stable sol. The X-ray diffraction spectrum (Test Procedure 3) of the zirconia particles showed [$ZrO_2$ (C,T) (11.4nm)]100+[$ZrO_2$(M) (13.5 nm)]33 and Photon Correlation Spectroscopy (test Procedure 5) gave a weight average mean particle diameter of 22.6 nm. Additional properties of the zirconia sol are presented in Table 1.

COMPARATIVE EXAMPLE C-1

The sol of this comparative example was prepared as follows:

Nyacol $ZrO_2$(Ac) (100 g) and deionized water (1463.3 g) were charged to a 1 liter beaker and the resulting mixture stirred at room temperature for about 30 min. A portion of the salt solution (1559 g) was poured into a 2 liter, unstirred, stainless steel Parr Reactor and the autoclave pressurized to about 2.75 bar (40 psi) with nitrogen. The autoclave was subsequently heated to 100° C. in approximately 70 min, to 150° C. over a period of approximately two hours, and finally to 175° C. (12 bars) and maintained at that temperature for about 18.5 hours. The autoclave was cooled and depressurized over a period of 2–3 hr. The zirconia sol was obtained as a dull white sol with a fair amount of sediment. X-ray diffraction (Test Procedure 3) of the zirconia particles showed [$ZrO_2$ (C,T) (11 nm)]100+[$ZrO_2$(M) (15 nm)]49 and Photon Correlation Spectroscopy (Test Procedure 5) gives a weight average mean particle diameter of 49.8 nm. Additional properties of the zirconia sol are presented in Table 1.

COMPARATIVE EXAMPLE C-2

Comparative Example C-2 is commercially available zirconia sol having an average particle size of about 100 nm, available from Nyacol Products Inc., Ashland, Mass. under the trade designation "Zr 100/20".

COMPARATIVE EXAMPLE C-3

Comparative Example C-3 is commercially available zirconia sol having an average particle size of about 50 nm, available from Nyacol Products Inc. under the trade designation "Zr 50/20".

TABLE 1

| | Zirconia Sol Properties | | | | |
|---|---|---|---|---|---|
| Example | Acid Modifier (mmole/g $ZrO_2$) | Parts Cubic & Tetragonal | Cubic & Tetragonal Size (nm) | Parts Monoclinic | % Cubic & Tetragonal |
| 1 | MEEAA 5 mmole/g | 100 | 9 | 13 | 88 |
| 2 | MEEAA 2.5 mmole/g | 100 | 10.5 | 31 | 76 |

TABLE 1-continued

Zirconia Sol Properties

|   | | | | | |
|---|---|---|---|---|---|
| 3 | MEAA 5 mmole/g | 100 | 9 | 22 | 82 |
| 4 | MEAA 2.5 mmole/g | 100 | 11.4 | 33 | 75 |
| C-1 | None | 100 | 9 | 49 | 67 |
| C-2 | None | 0 | — | 100 | 0 |
| C-3 | None | 0 | — | 100 | 0 |

| Example | Average Crystallite Size (nm) | Dispersion Index | pH | PCS (nm) | Appearance |
|---|---|---|---|---|---|
| 1 | 9 | 1.455 | 1.9 | 13.1 | Clear sol, blue tint |
| 2 | 10.85 | 1.695 | 1.9 | 18.4 | Clear sol, blue tint |
| 3 | 9 | 2.411 | 2.2 | 21.7 | Clear sol, blue tint, slightly white |
| 4 | 11.92 | 1.895 | 1.9 | 22.6 | Clear sol, blue tint, slightly white |
| C-1 | 12.31 | 4.044 | 1.9 | 49.8 | Hazy white/blue sol |
| C-2 | 5.6 | 17.857 | 1.9 | 100 | Milky white |
| C-3 | 5.15 | 9.709 | 2.2 | 50 | Hazy white/blue sol, slightly milky |

| Example | % T (1.28% solids) | % T (10% solids) |
|---|---|---|
| 1 | 93.1 | 86.6 |
| 2 | 89.1 | 47.2 |
| 3 | 80.8 | 52.8 |
| 4 | 70.2 | 38.7 |
| C-1 | 25 | 1.1 |
| C-2 | 0 | 0 |
| C-3 | 13 | 0 |

A comparison of the data in Table 1 shows that the particles of examples 1–4 have much closer match between the crystallite size and the aggregate size as is evidenced by the dispersion index being close to 1. The dispersion index of Comparative Examples C-1 through C-3 generally show small average monoclinic crystal sizes, but significantly higher PCS values as well as higher dispersion indices, indicative of aggregation. Also, the data suggests that higher modifier acid levels (approximately 5 mmole/g $ZrO_2$) and longer modifier acid length tend to produce smaller agglomerate size and more transparent sols. Comparative example C-1 shows the results of the control reaction where no acid modifier was added and the resulting significant increase in the agglomerate size under these conditions. It should be noted that the acid length and amount charged can have a substantial effect on the amount of cubic/tetragonal phase present.

EXAMPLE 5

A polyether acid zirconium salt was prepared as follows:

Nyacol $ZrO_2(Ac)$ (96 g) and MEEAA (17.2 g, 5 mmole/g $ZrO_2$) were charged into a liter beaker and the reaction mixture stirred at room temperature (approximately 22° C.) for 30 minutes. Water and excess acetic acid were removed and the polyether acid zirconium salt was isolated as a dry solid by allowing the reaction mixture to evaporate in an evaporation dish placed in a circulating air oven maintained at approximately 80° C. for approximately 18 hours. The polyether acid zirconium salt was dissolved in deionized water to produce a clear polyether acid zirconium salt solution (1500 g total wt), the solution poured into a 2 liter, unstirred, stainless steel Parr Reactor and the autoclave pressurized to about 2.75 bars (40 psi) with nitrogen. The autoclave was subsequently heated to 100° C. in approximately 50 minutes, to 150° C. over a period of approximately 45 min, and finally to 175° C. (12 bars) and maintained at that temperature for about 22 hours. The autoclave was cooled and depressurized over a period of 2–3 hr. The zirconia sol of the present invention was obtained as a clear liquid with an opalescent blue color with no sediment.

The sol was concentrated via rotary evaporation to a stable clear blue sol of about 10 wt. % $ZrO_2$. The free acid was removed via multiple dialysis runs in 3 liter of water substantially as described in Example 1. The first three dialysis were 1–2 hr in duration and the forth dialysis was run overnight. The dialyzed sample was dried at 80° C. overnight to give 14.6 wt. % solids. Thermal gravimetric analysis of the resultant powder showed that it was 87.2 wt. % $ZrO_2$. Simple calculation shows that the starting sol was 12.71 wt. % $ZrO_2$. A portion of the dialyzed sol (5.04 g) was charged to a 25 ml round bottom flask and methoxy-2-propanol (7.0 g, available from Aldrich Chemical Co.), oleic acid (0.022 g, available from Aldrich Chemical Co.), acrylic acid (0.027 g, available from Aldrich Chemical Co.), MEEAA (0.021 g, available form Aldrich Chemical Co.) and phenoxyethylacrylate (0.46 g, available from Aldrich Chemical Co.) were charged to the flask in that order. Water and alcohol were removed from the reaction mixture via rotary evaporation followed by trap to trap distillation to produce a clear blue organosol in phenoxyethylacrylate with a refractive index of 1.5915 (refractive index of phenoxyethylacrylate is 1.518). Irgacure 184 photoinitiator (approximately 1 wt. %, Ciba Specialty Chemicals, Tarrytown, N.Y.) was added to the sol. A thin coating (0.1–0.2 g) of the mixture was cast between two PET liners and was cured using low pressure Hg lamps for 10 minutes. The resulting cured film was opaque white in appearance. Additional acrylic acid (0.018 g) was added to the remaining sol and the resulting mixture was cast between two PET liners and was cured using a low pressure Hg lamps for 10 minutes. The resulting cured film was clear, flexible and free standing. The refractive index of the film was measured to be 1.616 using Test Procedure 6.

A second portion of the dialyzed sol (5.0 g) was charged to a 25 ml round bottom flask and methoxy-2-propanol (7.19 g), oleic acid (0.022 g), acrylic acid (0.065 g), MEEAA (0.022 g) and phenoxyethylacrylate (0.525 g) were charged to the flask in that order. Water and alcohol were removed via rotary evaporation followed by trap to trap distillation to produce a clear blue organosol in phenoxyethylacrylate with a refractive index of 1.581 (refractive index of phenoxyethylacrylate is 1.518). Irgacure 184 (~1 wt. %) was added to the sol. The resulting mixture was cast between two PET liners separated by a 180 μm spacer and was cured using a low pressure Hg lamps for 10 minutes. The resulting cured film was clear, flexible and free standing. The refractive index of the film was determined to be 1.6155 using Test Procedure 6. The percent transmission at 600 nm of the 180 μm film was 84.2% (Test Procedure 2). A control was prepared as described above except that the zirconia sol was not added to the mixture. The percent transmission at 600 nm of the control was 82.19%. The $ZrO_2$ content of the film was determined to be 42.85 wt. % (Test Procedure 1).

A third portion of the dialyzed sol (15.0 g) was charged to a 100 ml round bottom flask and methoxy-2-propanol (21 g), oleic acid (0.066 g), acrylic acid (0.144 g), MEEAA (0.065 g) and phenoxyethylacrylate (0.885 g) were charged to the flask in that order. Water and alcohol were removed via rotary evaporation followed by trap to trap distillation to produce a clear blue organosol in phenoxyethylacrylate with a refractive index of 1.609. Irgacure 184 (~1 wt. %) was added to the sol. The resulting mixture was cast between two PET liners separated by a 180 µm spacer and was cured using a low pressure Hg lamps for 10 minutes. The resulting cured film was clear, flexible and free standing. The refractive index of the film was determined to be 1.6345 using Test Procedure 6. The percent transmission at 600 nm of the 180 µm film was 83% (Test Procedure 2). A control was prepared as described above except that the zirconia sol was not added to the mixture. The percent transmission at 600 nm of the control was 82.1%. The $ZrO_2$ content of the film was determined to be 53.9 wt. % (Test Procedure 1).

EXAMPLE 6

A polyether acid zirconium salt was prepared as follows:
Nyacol $ZrO_2(Ac)$ (182.09 g) and MEAA (24.42 g, 5 mmole/g $ZrO_2$) were charged to a liter beaker and the reaction mixture stirred at room temperature (approximately 22° C.) for 30 minutes. Water and excess acid were removed and the polyether acid zirconium salt was recovered as a dry solid (74.1 g) by allowing the reaction mixture to evaporate in an evaporation dish placed in a circulating air oven maintained at approximately 85° C. for approximately 24 hours. The polyether acid zirconium salt (74.1 g) was dissolved in deionized water (2771 g) to produce a clear polyether acid zirconium salt solution (2845.1 g total wt). A portion of the solution (1402.7 g) was poured into a 2 liter, unstirred, stainless steel Parr Reactor and the autoclave pressurized to about 2.75 bars (40 psi) with nitrogen. The autoclave was subsequently heated to 100° C. in approximately 40 minutes and then to 175° C. (12 bars) and maintained at that temperature for about 24 hours. The autoclave was cooled and depressurized over a period of 2–3 hr. The zirconia sol of the present invention was obtained as a clear liquid with an opalescent blue color with no sediment.

The sol was concentrated via rotary evaporation to a stable clear blue sol of about 15 wt. % $ZrO_2$. The free acid was removed via dialysis substantially as described in Example 1 except that the sample was dialyzed twice with 1 liter of water, each dialysis having a 1–2 hr. duration. A sample of the dialyzed sol was dried overnight at 80° C. to give 17.54 wt. % solids. Thermal gravimetric analysis of the resultant powder showed the powder was 89.99 wt. % $ZrO_2$. Simple calculation shows that the starting dialyzed sol was 15.78 wt. % $ZrO_2$. This sol was added to a NMP/Polyimide solution as described below and films were cast to obtain clear high refractive index composite materials.

A 10 wt. % stock solution (Stock Solution A) of a soluble polyimide, (polymer #17, prepared-as described in U.S. Pat. No. 5,750,641) in N-methyl pyrrolidone was prepared. A portion of stock solution A (2.0 g) was charged to a 25 ml round bottom flask followed by N-methyl pyrrolidone (5.0 g, available from Aldrich Chemical Co.), $ZrO_2$ sol (1.93 g, described above), N-methyl pyrrolidone (1 g), and stock solution A (0.45 g), in that order. Water was removed by rotary evaporation to produce a clear blue fluid organosol. The weight % of $ZrO_2$ in the composite film (PI6A) was approximately 55.42%.

A second portion of stock solution A (2.51 g) was charged to a 25 ml round bottom flask followed by N-methyl pyrrolidone (12 g) and $ZrO_2$ sol (2.52 g), in that order. Water was removed by rotary evaporation followed by trap to trap distillation to obtain a clear blue fluid organosol. The weight % of $ZrO_2$ in the composite film (PI6B) was approximately 61.4 wt. %.

A third portion of stock solution A (2.518 g) was charged to a 25 ml round bottom flask followed by N-methyl pyrrolidone (12.06 g) and $ZrO_2$ sol (3.71 g), in that order. Water was removed by rotary evaporation to produce a clear blue fluid organosol. The weight % of $ZrO_2$ in the composite film (PI6C) was approximately 68.8 wt. %.

An 8.8 wt. % stock solution (Stock Solution B) of a soluble polyimide (polymer # 1, prepared-as described in U.S. Pat. No. 5,750,641) in N-methyl pyrrolidone was prepared. A portion of stock solution B (2.85 g) was charged to a 25 ml round bottom flask followed by N-methyl pyrrolidone (12 g) and the $ZrO_2$ sol (2.5 g), in that order. Water was removed via rotary evaporation followed by trap to trap distillation to obtain a clear blue fluid organosol. The weight % of $ZrO_2$ in the composite film (PI6D) was approximately 61.28 wt. %.

A second portion of stock solution B (2.85 g) was charged to a 25 ml round bottom flask. To this was charged N-methyl pyrrolidone (19 g) and $ZrO_2$ sol (3.78 g) in that order. The water was removed via rotary evaporation followed by trap to trap distillation to obtain a clear blue fluid organosol. The weight % of $ZrO_2$ in the composite film (PI6E) was approximately 68.8 wt. %.

Composite films were prepared from polyimide stock solutions A and B as well as polyimide/zirconia nanoparticle organosols PI6A -PI6E in the following manner. Each solution was cast on glass and allowed to dry at 60° C. in nitrogen to produce clear, colorless films after approximately 4 hours drying. Residual solvent was removed by drying the films in a vacuum oven at 125° C. overnight. The solid films were then removed from the glass substrates by dipping the glass/film substrate in water. After dipping the film/substrates in water to delaminate the film from the glass substrates. The free standing films were uniformly thick, with sample to sample thickness ranging from 25 to 50 microns. The final films retained good optical clarity and were colorless.

The in-plane and out-of-plane refractive index of each of the films was measured with a Metricon 2010 Prism Coupler at 632.8 nm (helium-neon laser source). The results are listed in Table 2. The % transmission for the films was also measured at 600 nm (Test Procedure 2).

TABLE 2

| Film Refractive Index and Transmission Data | | | |
|---|---|---|---|
| Sample/Zirconia weight % | In-plane index | Out-of-plane index | Transmission |
| Stock Soln. A (0 wt. % $ZrO_2$) | 1.5600 | 1.5550 | 89.6 |
| PI6A (55 wt. % $ZrO_2$) | 1.6804 | 1.6755 | 84.4 |
| PI6B (61.4 wt. % $ZrO_2$) | 1.6998 | 1.6939 | 83.0 |
| PI6C (68.8 wt. % $ZrO_2$) | 1.7281 | 1.7270 | 82.5 |
| Stock Soln B (0 wt. % $ZrO_2$) | 1.6520 | 1.6420 | 88.2 |
| PI6D (61.3 wt. % $ZrO_2$) | 1.7330 | 1.7300 | 85.0 |
| PI6E (68.8 wt. % $ZrO_2$) | 1.7708 | 1.7696 | 83.5 |

EXAMPLE 7

Mono(methacryloxypolyethyeneglycol)succinate (MMPS) Preparatrion

Polyethyleneglycol methacrylate (16.00 g, available from Aldrich Chemical Co.) and succinic anhydride (4.15 g, available from Aldrich Chemical Co.) were heated to 80° C. with shaking for a period of 24 hours. A clear, somewhat viscous liquid was obtained which had an IR spectra consistent with the reaction with succinic anhydride. The compound was named mono(methacryloxypolyethyleneglycol) succinate (hereinafter "MMPS") having the structure indicated below:.

where n=6–8.

Surface Modified Colloidal Silica

A surface modified silica filler was prepared by thoroughly mixing Nalco 2329, (250 g, a colloidal $SiO_2$, 40 wt. % solids in water containing a sodium counter ion, H=8.4, and particle size 75 mn. available from Nalco Naperville, Ill.), methoxy-2-propanol (281.0 g, available from Aldrich Chemical Co.), and A174 (3.72 g, gammamethacryloxypropyltrimethoxysilane, available from Witco Osi Specialties, Danbury, Conn.). The Nalco 2329 silica sol was weighed into a 2L beaker and a premixed solution of the silane coupling agent A-174 in the methoxy-2-propanol slowly added to the silica with swirling (1–2 min). The resultant mixture was heated at 80° C. for 16 hr to produce a modified silica sol. Water (1 kg) was added to the modified silica sol and the resulting mixture spray-dried using a Buchi spray drier at 200° C. inlet temperature and an 85–100° C. outlet temperature Resin System Preparation A resin system comprising 2,2-bis[4-(2-hydroxy-3-methacryloyloxypropoxy)phenyl]propane (24.18 g, available from Aldrich Chemical Co.), diurethane dimethacrylate, CAS No. 41137-60-4, (33.85 g, commercially available as Rohamere 6661-0 from Rohm Tech, Inc., Malden, Mass.), ethoxylated (6 mole ethylene oxide) bisphenol A dimethacrylate, commercially available as Sartomer CD541 from Sartomer Inc, Exton, Pa.)., triethyleneglycol dimethacrylate (4.84 g, available from Aldrich Chemical Co.), camphorquinone (0.2 g, available from Aldrich Chemical Co.), diphenyl iodonium hexafluorophosphate (0.5 g, available from Aldrich Chemical Co.), ethyl 4-dimethylaminobenzoate (1.0 g, available from Aldrich Chemical Co.), 2,6-di-tert-butyl-4-methylphenol (0.1 g, available from Aldrich Chemical Co.), and 2-(2'-hydroxy-5'-methacryloxyethylphenyl)-H-benzotriazole (1.5 g, CAS 96478-09-0, available from Janssen Pharmaceutica, Titusville, Pa.) was prepared by adding the above components in the specified amounts and mixing until a uniform blend of the components as obtained.

$ZrO_2$ Sol Preparation

A polyether acid zirconium salt was prepared as follows.

Nyacol $ZrO_2(Ac)$ (200.04 g) and MEEAA (17.8 g, 2.5mmole/g $ZrO_2$) were charged to a liter beaker and the resulting mixture stirred at room temperature (approximately 22° C.) for 30 minutes. Water and excess acetic acid were removed and the polyether acid zirconium salt was recovered as a dry solid (78.17 g) by allowing the reaction mixture to evaporate in an evaporating dish placed in a circulating air oven maintained at approximately 85° C. for approximately 18 hours. The polyether acid zirconium salt was dissolved in deionized water (3047.4 g) to produce a clear polyether acid zirconium salt solution (3125.6 g), which was poured into a 2 liter, unstirred, stainless steel Parr Reactor, and the autoclave pressurized to about 2.75 bars (40 psi). The autoclave was subsequently heated to 100° C. in approximately 2 hr, to 150° C. over a period of approximately 1.5 hours, and finally to 175° C. (12 bars) and maintained at that temperature for 15 hours. The autoclave was cooled and depressurized over a period of 2–3 hr. The zirconia sol of the present invention was obtained as a clear liquid with an opalescent blue/white color with no sediment.

The sol was concentrated to approximately 20 wt. % $ZrO_2$ by distillation of the water to obtain a clear stable sol. Photon Correlation Spectroscopy (Test Procedure 5) gave a weight average mean particle diameter of 19.2 nm. The sol was dialyzed against deionized water substantially as described in Example 1 except that 5 dialysis treatments using 2 liters of deionized water were used. The IR spectrum showed no free acid. The sol was then dialyzed against 5 g acetic acid in 2 liters of water for three days. IR analysis confirmed exchange of a majority of the MEEAA for acetic acid. The resultant sol was stable (11.72 wt. % $ZrO_2$).

Composite 7A

Acetic acid dialyzed $ZrO_2$ sol (10 g, preparation described above) was added to a 100 ml beaker and 2-methoxypropanol (18 g), MMPS acid modifier (0.15 g, preparation described above) and resin (1.75 g, preparation described above) were added to the $ZrO_2$ sol, in that order, with stirring. Surface modified colloidal silica (2.6 g, preparation described above) was then added to the mixture, with stirring, to produce a uniform dispersion. The resultant dispersion/mixture was poured into a glass petri dish and dried at 80° C. for 2–3 hours. The material was molded and cured as described in the DTS/CS and visual opacity and radioopacity test procedures (Test Procedure 8). The visual opacity, radioopacity and diametral tensile strength (Test Procedure 7) were determined and are reported in the Table 3.

Composite 7B

Acetic acid dialyzed $ZrO_2$ sol (15 g, preparation described above) was added to a 100 ml beaker and 2-methoxypropanol (27 g), MMPS acid modifier (0.487 g, preparation described above) and resin (2.84 g, preparation described above) were added to the zirconia sol, in that order, with stirring. Surface modified colloidal silica (3 g, preparation described above) was added to the mixture, with stirring, to produce a uniform dispersion. The resultant dispersion/mixture was poured into a glass petri dish and dried at 80° C. for 2–3 hr. The material was molded and cured as described in the DTS/CS and visual opacity and radioopacity test procedures (Test Procedure 8). The visual opacity, radioopacity and diametral tensile strength (Test Procedure 7) were determined and are reported in the Table 3.

Composite 7C

Acetic acid dialyzed $ZrO_2$ sol (15 g, preparation described above) was added to a 100 ml beaker and 2-methoxypropanol (27 g), MMPS acid modifier (0.3896 g, preparation described above), acetic acid (0.05 g, available from Aldrich Chemical Co.), and resin (2.84 g, preparation described above) were added to the zirconia sol, in that order, with stirring. Surface modified colloidal silica (3 g, preparation described above) was then added to the mixture with stirring, to produce a uniform dispersion. The resultant dispersion/mixture was poured into a glass petri dish and dried at 80° C. for 2–3 hr. The material was molded and cured as described in the DTS/CS and visual opacity and radioopacity test procedures (Test Procedure 8). The visual opacity, radioopacity and diametral tensile strength (Test Procedure 7) were determined and are reported in the Table 3.

Composite 7D

Acetic acid dialyzed $ZrO_2$ sol (15 g, preparation described above) was added to a 100 ml beaker and 2-methoxypropanol (27 g), MMPS acid modifier (0.3896 g, preparation described above), acetic acid (0.105 g) and resin (2.84 g, preparation described above) were added to the zirconia sol, in that order, with stirring. Surface modified colloidal silica (3 g, preparation described above) was then added to the mixture, with stirring, to produce a uniform dispersion. The resultant mixture was poured into a glass petri dish and dried at 80° C. for 2–3 hr. The material were molded and cured as described in the DTS/CS and visual opacity and radioopacity test procedures (Test Procedure 8). The visual opacity, radioopacity and diametral tensile strength (Test Procedure 7) were determined and are reported in the Table 3.

TABLE 3

Cured Resin Properties

| Material # | Acid Modifier loading on ZrO$_2$ | Visual Opacity | Radiopacity | DTS after 24 hours (Mpa) |
|---|---|---|---|---|
| 7A | MMPS, 0.22 mmol/g | 0.18 | 1.60 | 59.03 |
| 7B | MMPS, 0.44 mmol/g | 0.16 | 1.58 | 63.86 |
| 7C | MMPS, 0.35 mmol/g and Acrylic Acid, 0.33 mmol/g | 0.16 | 1.56 | 65.66 |
| 7D | MMPS 0.35 mmol/g and Acrylic Acid, 0.66 mmol/g | 0.17 | 1.5 | 63.38 |

The complete disclosures of all patents, patent applications and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A zirconia sol comprising:
    an aqueous phase having dispersed therein a plurality of substantially non-associated single crystal zirconia particles having an average primary particle size about 20 nm or less and a dispersion index ranging from about 1–3, wherein the zirconia particles have a crystallinity index of about 0.65 or greater and about 70% or greater combined cubic and tetragonal crystal lattice structure in the absence of an effective amount of a crystal phase stabilizer.

2. The zirconia sol of claim 1, wherein the zirconia sol has an optical transmission of about 70% or greater at about 1.28 wt. % ZrO$_2$.

3. The zirconia sol of claim 1, wherein the zirconia sol has an optical transmission of about 20% or greater at about 10 wt. % ZrO$_2$.

4. The zirconia sol of claim 1, wherein the dispersion index ranges from about 1–2.5.

5. The zirconia sol of claim 1, wherein the dispersion index ranges from about 1–2.

6. The zirconia sol of claim 1, wherein the zirconia particles have an average primary particle size ranging from about 7–20 nm.

7. The zirconia sol of claim 1, wherein the zirconia particles have about 75% or greater combined cubic and tetragonal crystal lattice structure.

8. The zirconia sol of claim 1, wherein the zirconia particles have about 85% or greater combined cubic and tetragonal crystal lattice structure.

9. The zirconia sol of claim 1, wherein the zirconia particles comprise less than about 1 wt. % of a crystal phase stabilizer.

10. The zirconia sol of claim 1, wherein the pH of the sol is less than about 7.

11. The zirconia sol of claim 1, wherein the pH of the sol ranges from about 1–4.5.

12. The zirconia sol of claim 1, wherein the zirconia particles each have an outer surface and wherein a plurality of polyether carboxylic acid molecules are adsorbed onto the outer surface.

13. The zirconia sol of claim 12, wherein the polyether carboxylic acid has the general formula:

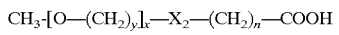

$$CH_3-[O-(CH_2)_y]_x-X_2-(CH_2)_n-COOH$$

wherein X$_2$ is selected from the group consisting of —O—, —S—, —C(O)O— and —C(O)NH;
    n ranges from about 1–3;
    x ranges from about 1–10; and
    y ranges from about 1–4.

14. The zirconia sol of claim 13, wherein the polyether carboxylic acid is selected from the group consisting of 2-[2-(2-methoxyethoxy)ethoxy] acetic acid and 2-(2-methoxyethoxy) acetic acid.

15. The zirconia sol of claim 1 further including a polyether carboxylic acid wherein at least a portion of the polyether carboxylic acid is adsorbed onto the zirconia particles.

16. The zirconia sol of claim 1, wherein the aqueous phase comprises a mixture of water and at least one carboxylic acid.

17. The zirconia sol of claim 1, wherein the zirconia particles have a cube-like shape.

18. A process for preparing a zirconia sol comprising the steps of:
    (a) providing an aqueous solution comprising a polyether acid zirconium salt; and
    (b) hydrolyzing the aqueous solution of the polyether acid zirconium salt by heating the solution at a temperature and a pressure sufficient to convert the polyether acid zirconium salt into crystalline zirconia particles.

19. The process for preparing a zirconia sol of claim 18, wherein step (a) comprises:
    (A) reacting an aqueous solution or sol of a zirconium salt with a polyether carboxylic acid to form an aqueous solution comprising a polyether acid zirconium salt and a free acid; and
    (B) optionally, removing at least a portion of the free acid.

20. The process for preparing a zirconia sol of claim 19, wherein step (B) comprises:
    (1) drying the aqueous solution of the polyether acid zirconium salt; and
    (2) dispersing the dried acid polyether acid zirconium salt in water to form an aqueous solution.

21. The process for preparing a zirconia sol of claim 19, wherein the polyether carboxylic acid has the general formula:

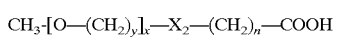

$$CH_3-[O-(CH_2)_y]_x-X_2-(CH_2)_n-COOH$$

wherein X$_2$ is selected from the group consisting of —O—, —S—, —C(O)O— and —C(O)NH;
    n ranges from about 1–3;
    x ranges from about 1–10; and
    y ranges from about 1–4.

22. The process for preparing a zirconia sol of claim 19, wherein the polyether carboxylic acid is selected from the group consisting of 2-[2-(2-methoxyethoxy)ethoxy] acetic acid and 2-(2-methoxyethoxy) acetic acid.

23. The process for preparing a zirconia sol of claim 19, wherein the zirconium salt has the general formula:

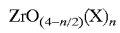

wherein X is a carboxylic acid displaceable counterion selected from the group consisting of formate, propionate, nitrate, chloride, carbonate and a combination thereof; and wherein n ranges from 0.5–4.

24. The process for preparing a zirconia sol of claim 19, wherein the zirconium salt is zirconium acetate.

25. The process for preparing a zirconia sol of claim 18, wherein the temperature ranges from about 140–250° C.

26. The process for preparing a zirconia sol of claim 18, wherein the pressure ranges from about 1–30 bars.

27. A zirconia sol prepared according to the process of claim 18.

28. A zirconia sol prepared according to the process of claim 18, said zirconia sol comprising:

an aqueous phase having dispersed therein a plurality of substantially non-associated single crystal zirconia particles having an average primary particle size about 20 nm or less and a dispersion index ranging from about 1–3, wherein the zirconia particles have a crystallinity index of about 0.65 or greater and about 70% or greater combined cubic and tetragonal crystal lattice structure in the absence of an effective amount of a crystal phase stabilizer.

29. A composite material comprising:

an organic matrix material having dispersed therein a plurality of single crystal zirconia particles having an average primary particle size less than about 20 nm and having a dispersion index ranging from about 1–3, wherein the zirconia particles have a crystallinity index of about 0.65 or greater and about 70% or greater combined cubic and tetragonal crystal lattice structure in the absence of an effective amount of a crystal phase stabilizer.

30. The composite material of claim 29 having an index of refraction of about 1.6 or greater.

31. The composite material o f claim 29 having an index of refraction of about 1.75 or greater.

32. The composite material of claim 29, wherein the organic matrix material is a monomer, oligomer, polymer or a mixture thereof.

33. The composite material of claim 29, wherein the organic matrix material is selected from the group consisting of acrylates, methacrylates, epoxies, styrenes and mixtures thereof.

34. The composite material of claim 29, wherein the organic matrix material is selected from the group consisting of polyolefms, polyesters, polyurethanes, polymethylmethacrylates, polystyrenes, polycarbonates, polyimides and mixtures thereof.

* * * * *

UNITED STATES PATENT AND TRADEMARK OFFICE
CERTIFICATE OF CORRECTION

PATENT NO. : 6,376,590 B2
DATED : April 23, 2002
INVENTOR(S) : Kolb, Brant U.

It is certified that error appears in the above-identified patent and that said Letters Patent is hereby corrected as shown below:

Title page,
Item [54], delete title "ZIRCONIA SOL, PROCESS OF MAKING AND COMPOSITE MATERIAL" and insert in place thereof -- ZIRCONIA SOL, PROCESS OF MAKING COMPOSITE MATERIAL --.

Column 11,
Line 42, delete "ing" and insert in place thereof -- using --.

Column 13,
Lines 16-17, delete "$[D(111)_{area\ 1}+D(-111)_{area2}+D(111)_{area\ 3}]/3$" and insert in place thereof -- $[D(111)_{area1}+D(111)_{area2}+D(111)_{area\ 3}]/3$ --.

Column 28,
Line 24, delete "polyolefms" and insert in place thereof -- polyolefins --.

Signed and Sealed this

Sixteenth Day of December, 2003

JAMES E. ROGAN
*Director of the United States Patent and Trademark Office*